US00RE46874E

(19) United States
(12) Reissued Patent
D'Silva et al.

(10) Patent Number: US RE46,874 E
(45) Date of Reissued Patent: May 29, 2018

(54) EXERCISE APPARATUS

(71) Applicant: D'Silva Limited, London (GB)

(72) Inventors: James Bernard D'Silva, London (GB); Glynn Ray Barber, Redkey, IN (US)

(73) Assignee: D'Silva Limited, London (GB)

(21) Appl. No.: 13/930,691

(22) Filed: Jun. 28, 2013

Related U.S. Patent Documents

Reissue of:
(64) Patent No.: 7,967,736
Issued: Jun. 28, 2011
Appl. No.: 12/542,390
Filed: Aug. 17, 2009

(30) Foreign Application Priority Data

Jun. 23, 2009 (GB) ..... 0910823.4

(51) Int. Cl.

| | |
|---|---|
| ***A63B 21/02*** | (2006.01) |
| ***A63B 26/00*** | (2006.01) |
| ***A63B 21/00*** | (2006.01) |
| ***A63B 17/00*** | (2006.01) |
| ***A63B 7/02*** | (2006.01) |
| ***A63B 22/20*** | (2006.01) |
| ***A63B 22/00*** | (2006.01) |

(52) U.S. Cl.
CPC ..... *A63B 21/1488* (2013.01); *A63B 7/02* (2013.01); *A63B 17/00* (2013.01); *A63B 21/00* (2013.01); *A63B 21/00043* (2013.01); *A63B 21/00065* (2013.01); *A63B 21/023* (2013.01); *A63B 21/4033* (2015.10); *A63B 22/0002* (2013.01); *A63B 22/203* (2013.01); *A63B 2022/0033* (2013.01); *A63B 2022/0035* (2013.01)

(58) Field of Classification Search
CPC ..... A63B 21/1488; A63B 22/0087
USPC ..... 482/23, 41–42, 121–123, 142
See application file for complete search history.

(56) References Cited

U.S. PATENT DOCUMENTS 1,582,487 A * 4/1926 Shank ..... 482/130
2,682,402 A * 6/1954 McCarthy ..... 482/135
(Continued)

FOREIGN PATENT DOCUMENTS

DE 236 877 A1 6/1986
FR 2 403 089 4/1979
(Continued)

OTHER PUBLICATIONS

Canadian Requisition by the Examiner including Examination Search Report directed to related Canadian Application No. 2,796,270 dated Feb. 15, 2016; 4 pages.
(Continued)

*Primary Examiner* — Glenn Dawson
(74) *Attorney, Agent, or Firm* — Sterne, Kessler, Goldstein & Fox P.L.L.C

(57) ABSTRACT

Apparatus suitable for pilates and other exercise comprises rails, supported on a box-like frame and an exercise carriage, mounted on the rails, wherein the carriage comprises a first carriage section and a second carriage section which sections can be (i) connected together to form a single exercise carriage which slides forwards and backwards on the rails, or (ii) disconnected to form two exercise carriages which independently slide forwards and backwards on the rails. The apparatus also has a seat with a spring-biased foot pedal and a spring-biased trapeze bar.

28 Claims, 7 Drawing Sheets

(56) References Cited

U.S. PATENT DOCUMENTS 3,584,871 A * 6/1971 Kelmon, Jr. ..... A63B 21/0004 482/123
3,735,979 A * 5/1973 Levenberg ..... A63B 9/00 482/143
3,770,267 A * 11/1973 McCarthy ..... 482/130
3,874,375 A * 4/1975 Penner ..... A61H 1/0218 482/144
3,948,513 A * 4/1976 Pfotenhauer ..... 482/142
4,046,373 A * 9/1977 Kim ..... 482/42
4,456,248 A * 6/1984 Smith ..... 482/142
4,506,884 A * 3/1985 Hankin ..... 482/131
4,512,571 A * 4/1985 Hermelin ..... 482/70
4,519,605 A * 5/1985 Leland ..... 482/92
4,907,798 A * 3/1990 Burchatz ..... 482/99
4,979,731 A * 12/1990 Hermelin ..... A63B 22/001 482/51
5,108,093 A * 4/1992 Watterson ..... A63B 22/0012 482/112
5,110,122 A * 5/1992 Moore ..... A63B 21/023 482/112
5,147,266 A * 9/1992 Ricard ..... 482/131
5,295,935 A * 3/1994 Wang ..... A63B 21/0552 482/123
5,480,367 A * 1/1996 Bergman ..... 482/122
5,509,878 A * 4/1996 Denega et al. ..... 482/110
5,681,249 A 10/1997 Endelman
5,941,800 A 8/1999 Laconis
6,186,929 B1 * 2/2001 Endelman et al. ..... 482/121
6,338,704 B1 * 1/2002 Endelman ..... 482/142
6,371,895 B1 * 4/2002 Endelman et al. ..... 482/135
6,450,923 B1 * 9/2002 Vatti ..... 482/8
6,514,180 B1 * 2/2003 Rawls ..... A63B 21/005 482/51
6,527,685 B2 * 3/2003 Endelman et al. ..... 482/121
6,926,646 B1 * 8/2005 Nguyen ..... A63B 22/001 428/70
6,926,650 B2 * 8/2005 Endelman et al. ..... 482/121
7,070,546 B1 * 7/2006 Grasso ..... A63B 21/072 482/103
7,104,937 B2 * 9/2006 Arbuckle et al. ..... 482/142
7,125,369 B2 * 10/2006 Endelman ..... A63B 21/154 482/121
7,125,370 B1 * 10/2006 Schaffner et al. ..... 482/142
7,255,666 B2 * 8/2007 Cardenas ..... A61H 1/0229 482/143
7,294,100 B2 * 11/2007 Bull ..... 482/51
7,384,384 B2 * 6/2008 Horvath ..... 482/142
7,470,219 B2 * 12/2008 Larson ..... 482/54
7,494,450 B2 * 2/2009 Solomon ..... A61H 1/0229 482/51
7,597,656 B2 * 10/2009 Trees ..... 482/142
7,641,603 B2 * 1/2010 Lacher ..... 482/134
7,651,450 B2 * 1/2010 Wehrell ..... 482/124
7,674,211 B2 * 3/2010 Uygan ..... 482/123
7,682,297 B2 * 3/2010 Graham ..... 482/122
7,686,741 B2 * 3/2010 Larson ..... 482/54
7,803,095 B1 * 9/2010 LaGree ..... 482/140
7,806,805 B2 * 10/2010 Barufka et al. ..... 482/5
7,833,139 B1 * 11/2010 Endelman et al. .. A63B 21/154 254/414
7,850,578 B2 * 12/2010 Balaker ..... A63B 21/156 482/131
7,850,584 B2 * 12/2010 Uygan ..... 482/130
7,857,736 B2 * 12/2010 Merrithew et al. ..... 482/121
7,862,489 B2 * 1/2011 Savšek et al. ..... 482/121
8,100,815 B2 * 1/2012 Balaker ..... A63B 21/156 482/131
8,137,251 B2 * 3/2012 Tozzi ..... A63B 22/203 482/132
8,641,585 B2 * 2/2014 LaGree ..... 482/94
8,808,152 B1 * 8/2014 Midgett ..... A63B 21/015 482/146
D726,263 S * 4/2015 Anderson ..... D21/676
9,011,296 B2 * 4/2015 Peralo ..... A61H 1/02 482/123
2001/0056011 A1 * 12/2001 Endelman et al. ..... 482/121
2002/0058573 A1 * 5/2002 Endelman et al. .. A63B 21/023 482/142
2003/0195095 A1 * 10/2003 Endelman et al. ..... 482/142
2003/0216230 A1 11/2003 Wang ..... A63B 21/156 482/123
2004/0053752 A1 * 3/2004 Yang ..... A63B 21/0552 482/70
2004/0176227 A1 * 9/2004 Endelman ..... A63B 21/154 482/142
2004/0192515 A1 * 9/2004 Cane' ..... 482/54
2005/0113226 A1 * 5/2005 Endelman ..... A63B 21/04 482/142
2005/0215401 A1 9/2005 Wilson et al.
2005/0245367 A1 11/2005 Horvath
2005/0255971 A1 * 11/2005 Solomon ..... 482/54
2006/0199706 A1 * 9/2006 Wehrell ..... 482/92
2006/0199712 A1 * 9/2006 Barnard et al. ..... 482/142
2006/0252616 A1 * 11/2006 Gerschefske ..... A63B 5/00 482/142
2007/0028550 A1 * 2/2007 Clapper ..... E04G 3/26 52/650.3
2008/0015095 A1 * 1/2008 Savsek et al. ..... 482/121
2008/0058174 A1 * 3/2008 Barnard et al. ..... 482/92
2008/0090708 A1 * 4/2008 Balaker ..... A63B 21/156 482/138
2009/0098983 A1 * 4/2009 Hoffman ..... A63B 21/055 482/70
2009/0118102 A1 * 5/2009 Larson ..... 482/51
2009/0143201 A1 * 6/2009 Uygan ..... 482/93
2009/0176630 A1 * 7/2009 Larson ..... 482/68
2009/0247376 A1 * 10/2009 Merrithew et al. ..... 482/121
2010/0004101 A1 * 1/2010 Solow et al. ..... 482/96
2013/0217551 A1 * 8/2013 Parnell ..... A63B 21/0442 482/141
2014/0011645 A1 * 1/2014 Johnson ..... A63B 21/4033 482/121
2014/0031175 A1 * 1/2014 Peralo ..... A61H 1/02 482/66
2014/0141948 A1 * 5/2014 Aronson ..... A63B 21/023 482/128

FOREIGN PATENT DOCUMENTS

JP 55-052772 4/1980
JP 2004-97663 A 4/2004
WO WO 2005/044393 A1 5/2005

OTHER PUBLICATIONS

British Search Report for British Application No. GB0910823.4, mailed Oct. 23, 2009, Intellectual Property Office, South Wales, United Kingdom.
International Search Report for International Application No. PCT/GB2010/001245, mailed Dec. 20, 2010, 4 pages.

* cited by examiner

EXERCISE APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

The present invention relates to exercise apparatus and the use thereof.

BACKGROUND

Various types and varieties of exercise equipment are available for home or gymnasium use. A known apparatus for performing exercises such as pilates exercise includes a moveable seat, referred to as a carriage, slidably mounted on carriage rails. Adjustable spring resistance connects the carriage to the apparatus frame, against which users can perform a variety of exercises using their leg, arm or other muscles. The carriage rails form part of a frame which has overhead rails on which hanging bars can be located for further exercise options.

Other known apparatus consists e.g. of separate, free-standing seats with pedals mounted against spring resistance for exercise typically of leg muscle groups, mats for floor work, wall-mounted ladders and wall-mounted hanging bars. Users move between pieces of equipment for different exercises.

These known apparatus have a number of disadvantages. The height and length of the equipment is generally rather limited, with the result that the equipment can not accommodate all sizes of people. It is often not possible to lie down completely on the existing equipment for those above a certain height. Generally, only one person at a time can use the equipment. Several items of equipment may be needed in order to carry out a full spectrum of pilates and other exercises. In a gymnasium or pilates studio, budgetary issues may force a decision between purchase of individual pieces of equipment.

An object of the present invention is to provide exercise apparatus that offers an alternative and/or improvement to the above. A further object of specific embodiments of the invention is to provide apparatus offering a wider range of muscle exercises. A still further object of specific embodiments of the invention is to provide apparatus for exercises not possible with existing apparatus

SUMMARY OF INVENTION

Accordingly, the present invention provides exercise apparatus, comprising:— rails, supported on a frame; and an exercise carriage, mounted on the rails;

wherein the carriage comprises a first carriage section and a second carriage section which sections can be (i) connected together to form a single exercise carriage which slides forwards and backwards on the rails, or (ii) disconnected to form two exercise carriages which independently slide forwards and backwards on the rails.

The apparatus thus has a carriage, running on the rails, which can be used as a single carriage or split into two independent sections, providing options for additional instability and thus options for additional exercises.

The apparatus preferably comprises an exercise chair, mounted on the frame. This enables sequential use of the carriage and then the chair by a user or simultaneous use of the carriage and the chair by separate users.

The apparatus preferably comprises a trapeze bar, mounted on the frame. Similarly, this enables sequential use of the trapeze bar and the carriage by a user or simultaneous use of the carriage and the trapeze by separate users. This further enables simultaneous use of the trapeze bar and carriage by the same user.

DETAILS OF INVENTION

Exercise apparatus of the invention has two rails, supported on a frame, and an exercise carriage, mounted on the rails, wherein the carriage comprises a first carriage section and a second carriage section which sections can be (i) connected together to form a single exercise carriage which slides forwards and backwards on the rails, or (ii) disconnected to form two exercise carriages which independently slide forwards and backwards on the rails.

The carriage typically runs backwards and forwards on rollers along the rails, and while it can run freely it is generally biased towards one end of the frame, suitably by resistance provided e.g. by springs, the number or strength of which can be varied. Resistance may be provided by a variety of devices used or suitable for use in like exercise equipment. Lengths of elastic material, e.g. rubber or elasticated cord, can be used. Springs are particularly suitable, and can be compression or extension springs and can be mechanical, hydraulic or pneumatic springs. Typically metal springs are used, especially helical springs. In an embodiment of the invention shown in the example, from one to five springs can be attached between the carriage and a plate at the frame end.

The apparatus is usually incorporated into a box-like frame defining an exercise area within and around the frame, the frame comprising:—

- the two rails on which the carriage is mounted and referred to as lower rails;
- two left hand side uprights, being proximal to the first carriage section;
- two right hand side uprights being proximal to the second carriage section; and
- two upper rails mounted between the two pairs of uprights.

A front face of a preferred apparatus is thus made up of a lower rail, a left-hand upright, an upper rail and a right-hand upright, forming a rectangular frame portion. A rear face has, correspondingly, a rectangular frame portion made up of a lower rail, left-hand upright, upper rail and right-hand upright. The two rectangular frame portions are held spaced apart by four cross pieces connecting the respective corners of the frame portions and forming the box-like frame.

For use with the moveable carriage, four pulleys may be provided, two mounted on each of the left hand side uprights, wherein each pulley is slidably adjustable along the upright and can be fastened at any position, hence the position of each pulley is infinitely adjustable along the length of its upright. The apparatus may have two ropes threaded through the pulleys and two rope cleats on the carriage, e.g. on either side of the first carriage section, and wherein the ropes have two ends, one of which is free and one is to attach to one of the rope cleats. A handle or a foot strap may be at the free end of the rope and the other end can be secured to the split carriage via a cleat. Thus, for any particular use the relative positions of the rope ends and of the carriage on the rails can be adjusted by pulling the rope through the cleat, or alternatively by letting the rope off and then securing it in the cleat.

A wide range of movements and exercises, either free or against resistance can be performed using the carriage. Generally, the carriage, whether split or as a single unit slides against an adjustable resistance, provided for example by springs, though other means of providing resistance are suitable too.

Springs can be removably attachable to the frame, the first carriage section and the second carriage section so that:

the first carriage section can be connected by one or more springs to the second carriage section; and/or the second carriage section can be connected by one or more springs to the frame.

Springs may additionally or alternatively be removably attachable to the frame, the first carriage section and the second carriage section so that:

the first carriage section can be connected by one or more springs to the second carriage section; and/or the first carriage section can be connected by one or more springs to the frame.

Individuals requiring differing resistance strengths are able to adjust the resistance accordingly. The apparatus may thus comprise from 2 to 5 springs which can each be independently connected between the first carriage section and the frame, from 2 to 5 springs which can each be independently connected between the first carriage section and the second carriage section, and/or from 2 to 5 springs which can each be independently connected between the second carriage section and the frame.

It is optional to include a lock so that the first carriage section can be secured at any position along the rails. Additionally or alternatively, a lock may be provided to lock the second carriage section at any position along the rails.

In an example of the apparatus in use, the carriage is split, with the first carriage section locked onto the rails and the second carriage section not locked but attached by 2 springs to the first. Exercise is then possible by a user urging the second carriage section away from the first, working against the 2 springs. As will be appreciated, different combinations of carriage section position and springs can be adopted according to the exercise needed.

A further optional feature, illustrated in a specific embodiment shown in the figures, is a chair or seat with an exercise bar or pedal. This has a seating area, generally a flat, wide, horizontal platform which attaches to the uprights at either end of the frame, in close proximity to a pivotable foot bar, the foot bar also being attached to the frame, towards the bottom of the uprights, and connected via one or more springs to the frame so that it can be used for exercise by a user sitting on the seat and pushing at the foot bar, resistance being generated by the springs.

A preferred apparatus of the invention hence comprises a seat mounted between the two left hand uprights, or between the two right hand uprights, and a spring-biased foot pedal associated with the seat. Springs connecting the pedal to the uprights or to the seat may offer resistance to movement of the pedal away from the seat by a user.

A still further feature of embodiments of the invention is the inclusion of a trapeze bar attached to the uprights, at either end of the frame. It securely connects at one end and can pivot. The trapeze bar can optionally be attached via springs between the lower portion of the bar and the frame, providing resistance against which the bar can be moved.

Apparatus described below comprises a trapeze bar removably attached to the frame and which can be mounted between the two left hand uprights, or between the two right hand uprights or between the two upper rails. It is biased to provide resistance to movement. Springs may connect the trapeze bar to the uprights or to the rails to offer resistance to movement of the bar by a user.

The apparatus may also have a foot bar attached to uprights at either end of the frame, which can be locked at substantially any height. The foot bar can be attached between the left hand uprights or the right hand uprights.

The apparatus preferably comprises adjustable-height feet, for accurate positioning and levelling of the apparatus on uneven surfaces.

Extensions to the top rails can be provided, projecting to the side beyond the junction with the uprights and referred to as ladder bars, which enable optional attachment of a ladder, extending from the ladder bars to the floor. This allows still further exercises to be performed using the bars or using a ladder that descends from the bars to the floor. The apparatus may thus comprise a ladder attached to the upper rails.

During exercise, the carriage, whether split or unitary, slides on the rails. There is always a danger that it will slide fully to the end of the rails and meet the frame abruptly. In embodiments of the invention, the apparatus comprises one or more buffers or shock absorbers to lessen the impact of the exercise carriage at the limits of its travel on the rails, as a safety feature.

The apparatus may further comprise a flat board, attached to the right hand uprights or to the left hand uprights, substantially perpendicular to the exercise carriage. Referred to as a "jump board", the height of the board can be adjusted on the uprights and the board improves the range of exercises possible.

The apparatus may optionally further comprise two or more, or four or more hand/foot grips, hanging from the upper rails, each optionally and independently attached by springs. The provision of these handles and springs (if present) from the upper rails enable "airborne" exercises, with the user's weight supported from the upper rails and the user exercising in mid-air. This again provides the possibility of various rehabilitation work that is not possible on other machines. In addition, known machines do not provide enough springs/handles to enable this exercise.

Additional optional aspects of the apparatus are (i) a static board, which can be placed onto the rails, providing in conjunction with the carriage an elongated mat-like working area, and (ii) a box which can be placed on top of the carriage and/or the static board, enabling box work. A typical box has approximate dimensions 36 cm×46 cm×81 cm (14 inches by 18 inches by 32 inches).

A preferred embodiment of the invention comprises (i) the carriage made up of a first carriage section and a second carriage section connected by spring resistance to the frame, and (ii) the jump board. A user can sit or lie on the carriage, connect from one up to five of the springs between the carriage and the frame and exercise leg muscles by placing the user's feet on the jump board and pushing the carriage away from the right hand end of the frame. The user can lie on the carriage, with the user's head between and user's shoulders pushing against removable shoulder pads on the carriage.

A further preferred embodiment of the invention comprises (i) the carriage having first and second carriage sections, and (ii) the two ropes and four pulleys. A user can sit on the carriage, place each hand into one of the hand grips, thread each rope through two pulleys on the left-hand upright and secure the rope onto the cleats at the front of the first carriage section. One or more springs are then connected between the carriage and the right hand end of the frame. In a sitting position, the user can pull on the ropes, which will urge the carriage towards the left-hand side and away from the right-hand side of the frame against the spring resistance.

Another preferred embodiment of the invention comprises (i) the carriage split into first and second carriage sections, (ii) the box-like frame as described above, and (iii) two hand grips attached via springs to one or more cross bars between upper rails of the frame. A user can simultaneously pull on the hand grips against the spring resistance and move the carriage against its separate spring resistance.

A particularly preferred embodiment of the invention comprises (i) the carriage which can be split into first and second sections, (ii) the jump board, (iii) the trapeze bar and (iv) the chair.

The invention is now illustrated with reference to the accompanying drawings, in which:—

The illustrated apparatus works on spring resistance and has a carriage (bed) that can be split into two and a pulley system that can be adjusted in height to suit the versatility of the exercise and the size and ability of the exerciser.

The pulley system allows for work on targeted muscle groups of the upper and lower body and also the core muscles. A jumping board provides a cardiovascular workout and is used for remedial foot and body work. The overall frame is stronger, higher, longer, wider and more stable than previous machines, using aircraft-grade aluminium and steel.

The invention thus provides exercise equipment that is truly multi-functional. It offers a wide range of exercises and a much greater range of movements due e.g. to the infinite adjustability of its clamps, bars, hooks and springs; this serves to give it the edge compared to existing apparatus, that have a limited number of fixed position settings.

The increased range of features available for incorporation into the apparatus means that exercises can be performed from sitting, lying, standing, hanging, leaning and kneeling, making it a multi-functional piece of apparatus for all ages, sizes and abilities. It is ideal for rehabilitation, sports-specific training and general body conditioning.

An increased working area—within and around the apparatus—allows for a wide range of exercises and makes the machine more comfortable for all body shapes and sizes particularly for athletes and those with a bulkier frame. The size and strength of the machine allows for up to three people to work on it at the same time.

A trapeze bar is positioned on the side frames or overhead and allows for a greater range of movement that would not be possible from one fixed position.

The carriage can also be separated or connected into and used as a single platform; it can be fixed at any position along the length of the rails, this allows for spring work on the upper and lower body and the use of one or more overhead trapeze bars. The option to split the carriage improves the versatility of the machine and allows for an increased repertoire of exercises also with variability of resistance between the two carriages, this serves to focus on muscle instabilities that can compromise other exercises and activities.

An extension platform or static board is included which converts the whole length of the frame into an elongated bed that can be used for mat work and exercises that are usually carried out on the floor.

An adjustable-height chair, the "wonder chair" system is another feature and is removably attached to either the left or the right hand side of the frame over a spring resistance pedal that can work to strengthen all the muscle groups.

Figure 1:
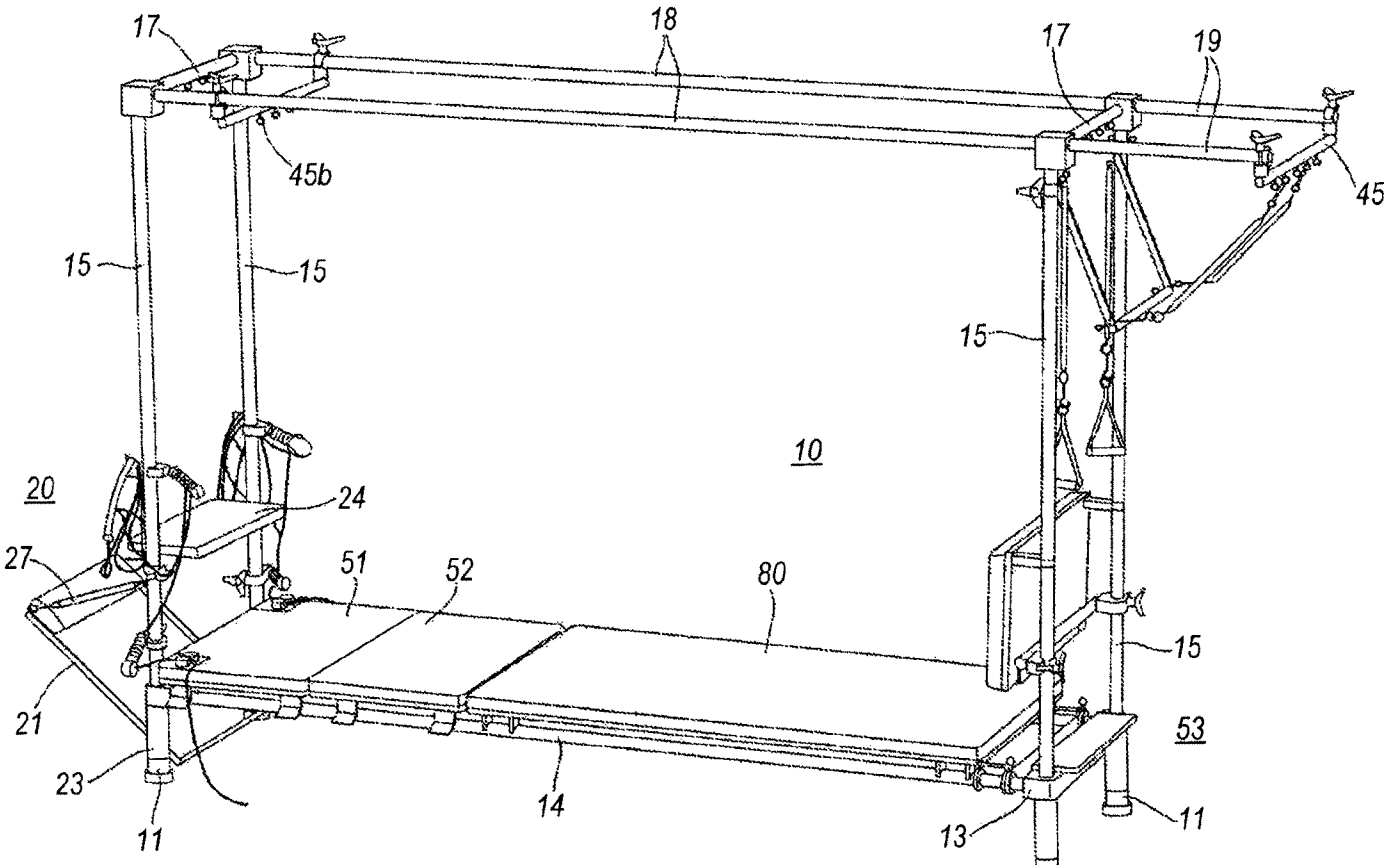
FIG. 1 shows a view from the right hand side and slightly above of an apparatus of the invention.

Referring to all Figures and FIG. 1 in particular, the apparatus assembly 10 comprises four 10 cm (4") diameter aluminium feet 11 attached to 7.5 cm (3") diameter steel legs 12 with a 1.88 cm (¾")-10 steel stud per leg and foot assembly, centred, making the individual foot assembly adjustable, thus creating a levelling pad for the apparatus 10 when in situ. The steel legs 12 are bored to a 4.39 cm (1¾") ID 15 cm (6") deep.

Two 7.5 cm (3") steel legs with the aluminium foot facing the floor are attached to the aluminium ends (base housings 13) on 72.5 cm (29") centres with 3 0.78 cm (5/16")-18 shoulder bolts per leg. The aluminium base housings 13 are 1.88 cm (¾") thick×10 cm (4") wide×80 cm (32") length. There are two aluminium base housings 13 per apparatus. These base housings have mounted between them 2 steel tubing 5 cm (2") OD×0.63 cm (¼")×292.5 cm (117") length carriage rails 14 with welded inserts in each end creating a 0.94 cm-0.47 cm (⅜"-16) tapped hole for a single fastener. The base housings are bored to a 3.8 cm (1.5") depth creating a working envelope between the two assembled base housings of 285 cm (114").

The base housings are vertically bored with two 4.30 cm (1¾") diameter holes placed on 72.5 cm (29") centres. These four holes are fitted with four steel upright tubes 15, being 4.30 cm (1¾") OD×0.24 cm (0.095") wall×210 cm (84") lengths. These uprights tubes 15 are then inserted vertically through the base housings and into the steel leg. Then a single 0.94 cm-0.47 cm (⅜"-16) fastener is used to bind the upright, also referred to as vertical tube 15, the base housings 13 and the split carriage guide rail 14 (10 cm (2") diameter tubing)).

Atop each of the vertical tubes 15 rests a 10 cm×10 cm×10 cm (4"×4"×4") aluminium junction 16. There is one 4.38 cm (1¾") diameter×68.13 cm (27.25") cross tube 17 mounted parallel to each base housing, between two of the 10 cm (4") square aluminium junctions 16. Then two 4.39 cm (1¾") diameter×360 cm (144") length top rail tubes 18 are inserted through the one 10 cm (4") junction block and into the end opposite junction. This creates a rectangular frame above the existing assembled grounded frame leaving 60 cm (24") of 4.38 cm (1¾") diameter tubing protruding as trapeze rails 19 from one end of the machine. All 4.38 cm (1¾") diameter tubes are then fastened to the 10 cm (4")

square junctions using 0.78 cm-0.69 cm (5/16"-18) fasteners. This completes the entire frame assembly of the apparatus.

Figure 9:
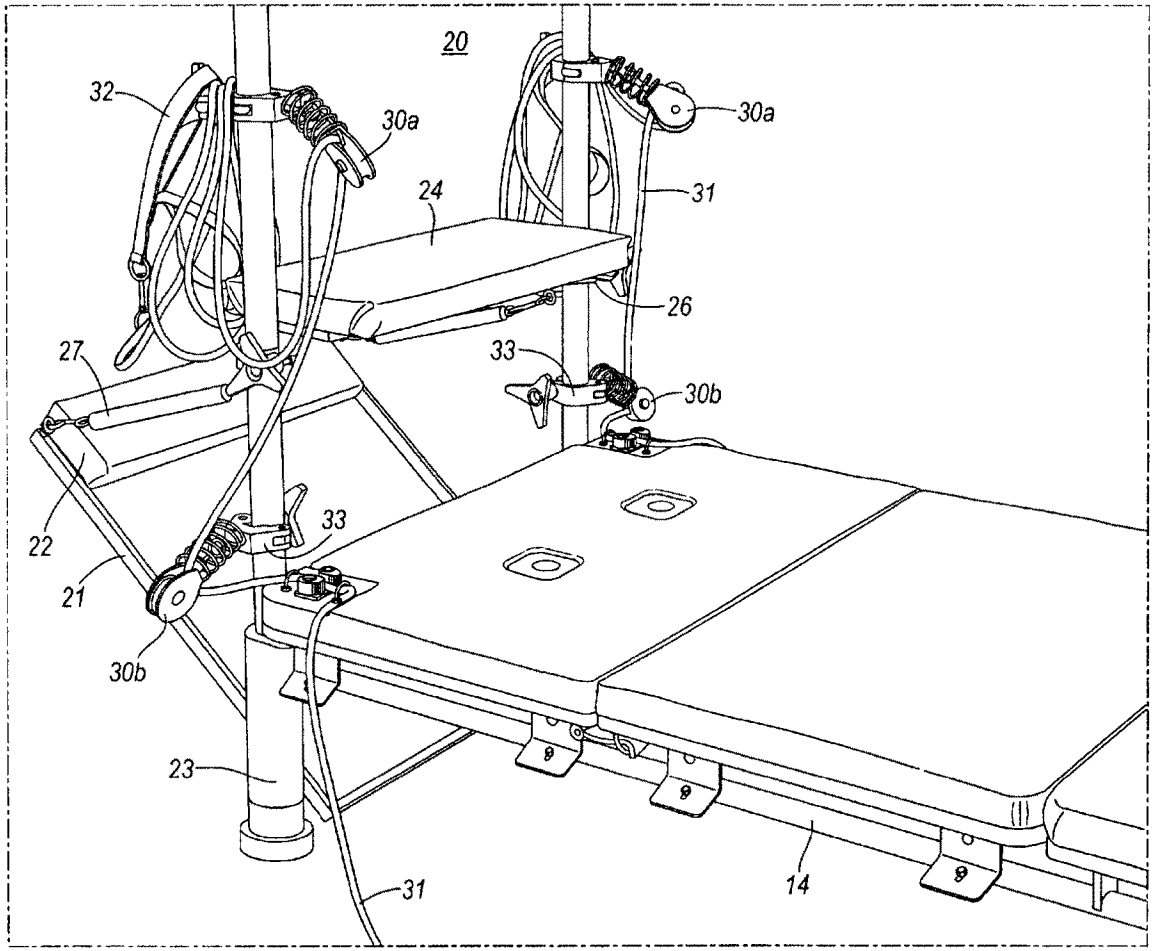
FIG. 9 shows detail of the left hand side of the apparatus, including the pulleys and the chair.

Referring to FIGS. 1 and 9, the wonder chair 20 consists of an aluminium frame 21 with a padded foot pedal 22. The frame 21 has 0.63 cm (¼") pins at the end opposite the foot pedal that attach to either end of the apparatus base 23 using 0.63 cm (¼") holes in the steel legs of the frame of the apparatus. Seat assembly 24 is attached to a 0.94 cm (⅜")×7.5 cm (3")×70 cm (28") aluminium bar 25 which has a clamp 26 attached to both ends thus allowing a positioning of the seat 24 on either end of the machine or making the seat completely removable.

Springs 27 are attached at one end to the base of the frame 21 near the foot pedal and at their other ends to the uprights 15 to provide resistance when the foot pedal is pushed away from the uprights in use e.g. by someone sitting on the seat 24.

On each side of the uprights are mounted two upper and lower pulleys 30a, 30b through each pair of which is threaded rope 31 having at its respective each a hand/foot strap 32 for attachment in use to the hand or foot of a user and a free end (not shown) for location in and securing to the carriage (described below). The pulleys are attached to the uprights via releasable clamps 33 enabling them to be positioned at substantially any location up and down the uprights.

Figure 2:
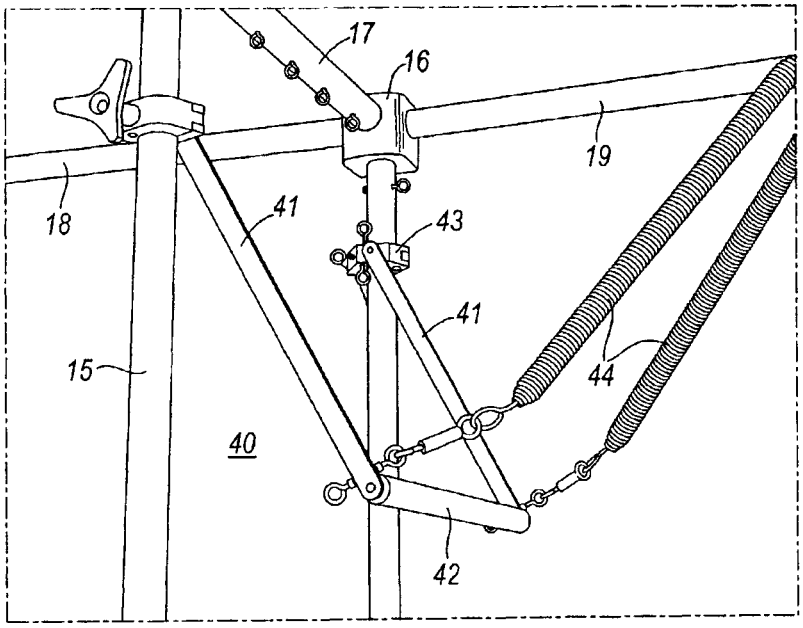
FIG. 2 shows detail of the trapeze bar.

Referring to FIG. 2, the trapeze bar 40 consists of two 1.3 cm (½")×2.5 cm (1")×47.5 cm (19") aluminium side bars 41 welded one end of each bar to a 3.13 cm (1¼") diameter×65 cm (26") aluminium trapeze rod 42. The side bars are then pivotally attached to two clamps 43. Springs 44 connect the end distal from the pivoting, clamped end to cross bar 45 (shown on e.g. FIG. 1) mounted across the protruding portions 19 of top rail tubes 18. The side bars and rod making up the trapeze bar are thus attached to the clamps and the frame allowing the trapeze bar to move back and forth, with resistance from the springs when the trapeze bar is moved away from the cross bar 45. The clamps are moveable on the uprights so as to be suitable any particular user. The clamps can also be removed and attached to the top rail tubes, giving greater positioning and user options. A second cross bar 45b is moveably attached to the top tubes, so the trapeze bar can be relocated to the other end of the frame, with the clamps attached to the uprights or to the top tubes.

Figure 3:
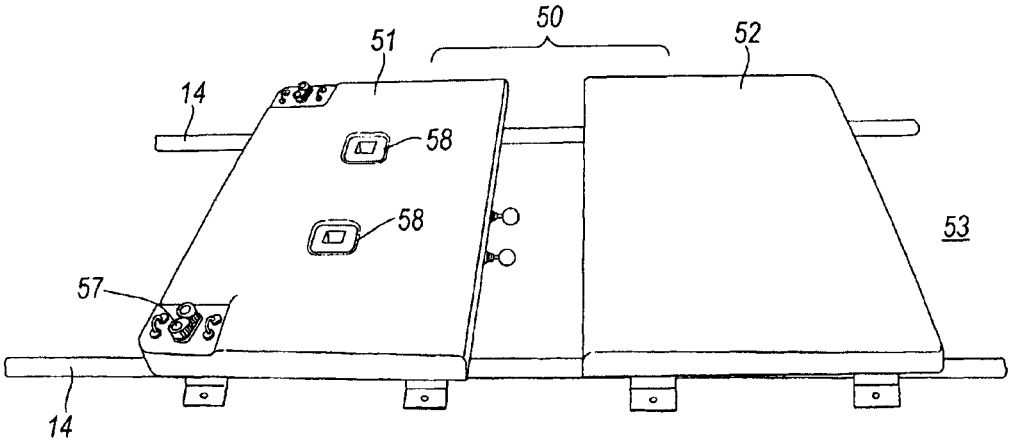
FIG. 3 shows an isolated carriage split into first and second sections.
Figure 4:
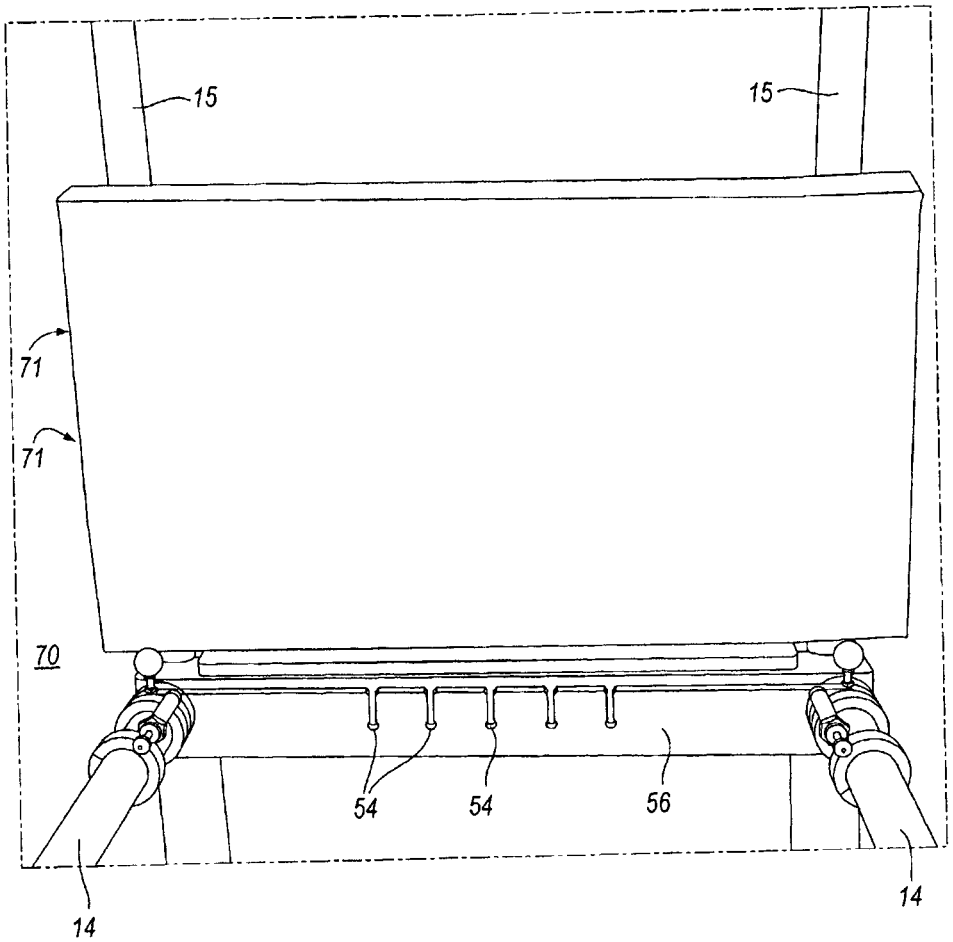
FIG. 4 shows detail of the right hand side of the apparatus with a jump board mounted on the right hand uprights.
Figure 7:
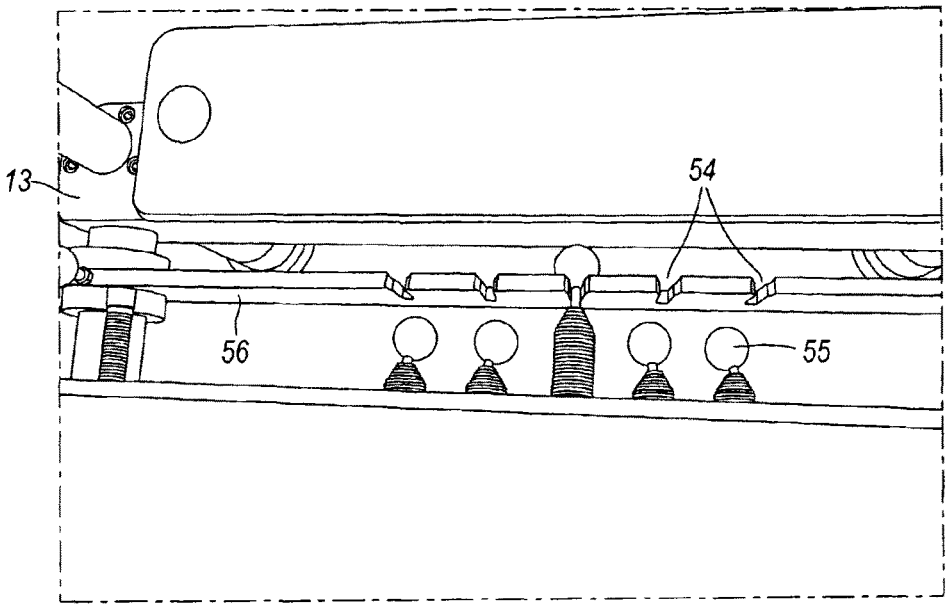
FIG. 7 shows a view from above of attaching springs in varying number between the carriage and the frame, one spring being connected.
Figure 8:
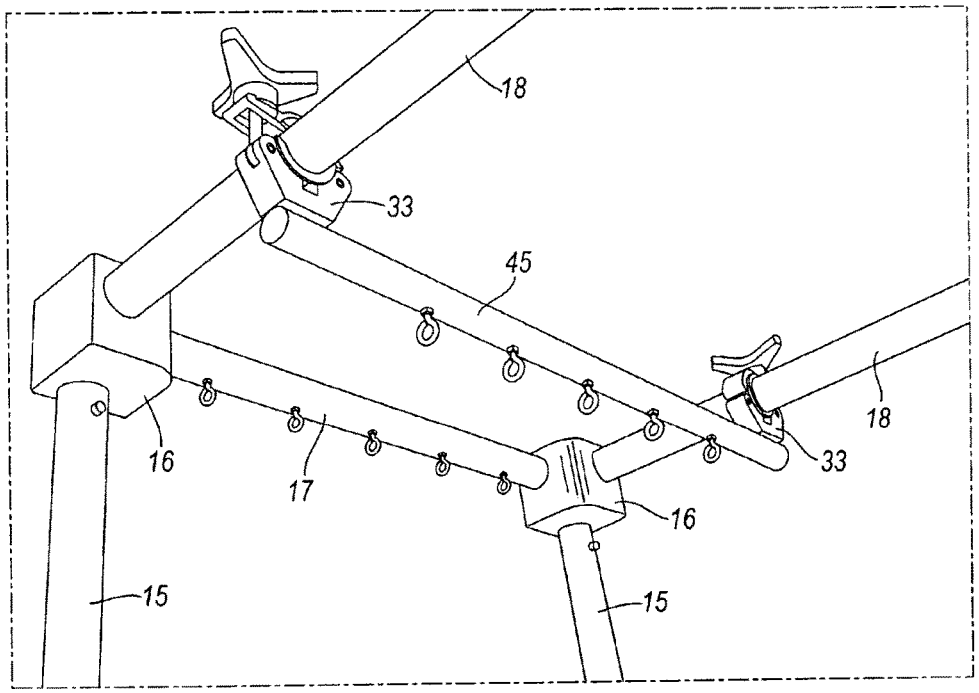
FIG. 8 shows detail of the upper rails, frame and a cross bar.

Referring to FIGS. 1 and 3, a split carriage 50 is mounted on runners on the carriage rails 14 and slides forward and back on the rails. The split carriage assembly consists of two halves, referred to as first carriage section 51 and second carriage section 52, each being 87.5 cm (35") wide×53.8 cm (21.5") long and 5 cm (2") thick. Each half has four steel bearing retainers with three bearing and wheel assemblies on a 120 degree rotation within the bearing retainer (details not shown). These bearing retainers are placed on 72.5 cm (29") centres in the 87.5 cm (35") plane and 40 cm (16") centres in the 53.8 cm (21.5") plane. The top bearings then set directly atop and centred on the 5 cm (2") diameter split carriage guide rails and the other two bearing and wheel assemblies on the 120 degree angles are slid into place, touching the 5 cm (2") diameter split carriage guide rails thus encompassing the split carriage guide rails. One half of the split carriage, the first carriage section 51 has 3 springs attached to it via a piece of aluminium angle. These 3 springs can be removably attached to the other half of the split carriage, the second carriage section 52 thus creating spring resistance between the two carriage halves, by placing the spring in a slot provided on the opposite split carriage half. In use one, two or three springs can be attached between the first and second carriage sections, varying the resistance at the choice of the user. The other half of the split carriage, the second carriage section 52, has a piece of aluminium angle with five springs attached. These 5 springs are easily attached, again removably, to the right hand end 53 of the apparatus by placing one or more or up to all five, using spring heads 55 (shown in FIG. 7) placed in the slots 54 provided by a piece of 0.94 cm (⅜")×7.5 cm (3")×87.5 (35") removable steel spring retainer 56 (shown in FIG. 4) affixed to the end 53 of the apparatus opposite the springs. The opposite half of the split carriage, first carriage section 51 has two cammed rope cleats 57 attached to the upper 2 corners. Rope 31 is threaded through two of the pulleys affixed vertically and attached to the rope cleat on the perspective side as described above. The opposite side is threaded the same. There is a hand/foot strap on the end of each rope opposite the cleat and the cleat allows infinite adjustability of the rope length to specifically allow any height or build to have a custom length rope immediately available for use. Towards the middle of the first carriage section are positioned two removable shoulder pads (not shown) which locate in shoulder pad anchor points 58. These pads project from the carriage section so that when a user is lying on the carriage section the user's head fits between the shoulder pads and the user's shoulders rest on the pads thus providing body stability so that various exercises can be carried out against the adjustable spring resistance of the apparatus with no body slippage. Each of the first and second carriage sections can be locked in any position along the split carriage guide rails using a Destako® vertical clamp (not shown) attached to each side, in the centre, or two Destako® clamps per split carriage section. The split carriage is stopped from ramming the end of the machine by two 1500 lb hydraulic shock absorbers 59, 1.88 cm (¾") in diameter×7.5 cm (3") shown in FIG. 5, attached to a 5 cm (2") split collar 60 which is affixed to each split carriage guide rail. This two-position shock absorption system is positioned to rest on the bearing retainers closest to the 5 spring, right hand end 53 of the apparatus.

The jump board 70 is comprised of a rectangular board, made in this case of two boards, covered with vinyl and foam, attached to the vertical frame uprights of the 5 spring end 53 of the apparatus with four Velcro® straps. The jump board is 80 cm (32")×45 cm (18")×5 cm (2") with four Velcro® straps attached on 72.5 cm (29") centres×40 cm (16") centres. The jump board can be positioned at any position on either the vertical frame uprights, top tubes, or split carriage guide rails but generally is used on the vertical uprights of the 5 spring end 53 of the apparatus, resting via hooks 71 on the foot bar 72, for jumping against one or more or all five of the five springs which can be attached between the right hand end 53 of the frame and the second carriage section.

The static full body board 80 is 87.5 cm (35")×168.8 cm (67⅓")×5 cm (2") covered in vinyl and foam. The static full body board has six aluminium rests positioned 72.5 cm (29") between centres in the 87.5 cm (35") plane and three per side positioned 137.5 cm (55") between centres in the 168.8 cm (67½") plane. This static full body board is laid on top of the split carriage guide rails to the end opposite the split carriage assembly creating a static working table encompassing the entire apparatus base.

Figure 5:
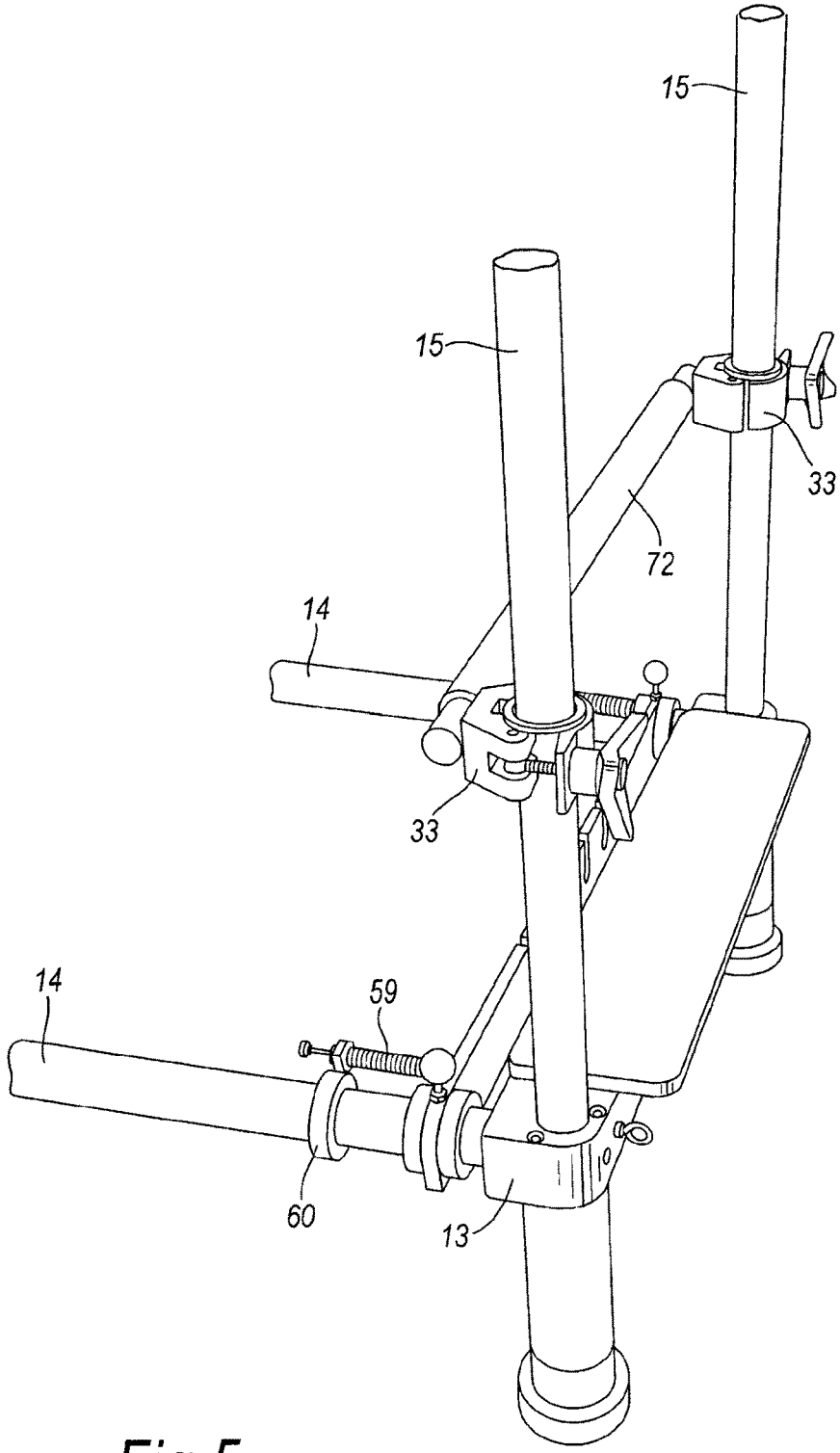
FIG. 5 shows detail of the right hand end of the frame (jump board not present)
Figure 6:
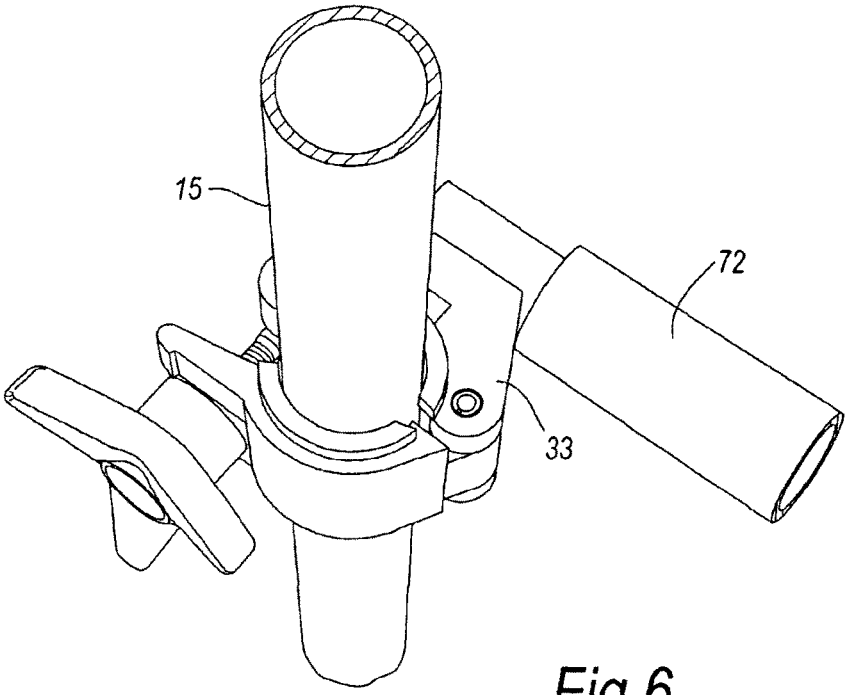
FIG. 6 shows detail of a clamp used to attach a foot bar to an upright of the frame of the apparatus.

The apparatus clamps 33, shown in detail in FIG. 5 consist of 2 pieces of aluminium with a roll pin strategically placed joining the two halves creating the clamp. The clamps are infinitely adjustable and are used with varying attachments for the foot bar 72, the cross bars 45, to secure the trapeze side bars 41, the pulleys 30 and to attach the seat assembly 24. These removable and infinitely adjustable clamps enable positioning of each of the respective devices at any position on the apparatus tubes, and their selective removal from the apparatus.

PARTS LIST

10 Apparatus
11 Foot
12 Leg
13 Base housing
14 Carriage rail
15 Upright tube
16 Junction
17 Cross tube
18 Top rail tubes
19 Trapeze rails
20 Wonder Chair
21 Frame
22 Foot pedal
23 Apparatus base
24 Seat assembly
25 Bar
26 Clamp
27 Spring
30a,b Pulley
31 Rope
32 Hand/foot strap
33 Pulley clamp
40 Trapeze bar
41 Side bar
42 Trapeze rod
43 Trapeze clamp
44 Trapeze springs
45 Cross bar
50 Split carriage
51 First carriage section
52 Second Carriage section
53 Right hand end of apparatus
54 Spring slot
55 Spring head
56 Spring retainer
57 Rope cleat
58 Shoulder pad
59 Shock absorbers
60 Split collar
70 Jump board
71 Hook
72 Foot bar
80 Body board The invention thus provides exercise apparatus and uses thereof.

The invention claimed is:

1. Exercise apparatus, comprising:

[(1)] a box-like frame defining an exercise area within and around the frame, comprising:

[(a)] two [rails, referred to as] lower rails, supported on the frame and on which is mounted an exercise carriage comprising a first carriage section and a second carriage section;

[(b)] two left hand side uprights, being proximal to the first carriage section;

[(c)] two right hand side uprights being proximal to the second carriage section; and

[(d)] two upper rails mounted between the two pairs of uprights, wherein the first carriage section and the second carriage section can be [(i)] connected together to form a single exercise carriage which slides forwards and backwards on the rails during exercise, and [(ii)] disconnected to form two exercise carriages which independently slide forwards and backwards on the rails during exercise;

[(2)] from 2 to 5 springs removably attachable to the frame, the first carriage section and/or the second carriage section so that:

the first carriage section is connectable by one or more of the springs to the frame; and / or the first carriage section is connectable by one or more of the springs to the second carriage section; and / or the second carriage section is connectable by one or more of the springs to the frame;

[(3)] a lock to lock the first carriage section at any position along the rails;

[(4)] a lock to lock the second carriage section at any position along the rails;

[(5)] two pulleys attached to the frame, two ropes threaded through the pulleys and two rope cleats located on the first carriage section, and wherein the ropes have two ends, one of which is free and one is to attach to one of the rope cleats;

[(6)] a seat mounted between the two left hand *side* uprights, or between the two right hand *side* uprights, and a resistance-biased foot pedal associated with the seat, *further comprising springs connecting the pedal to the uprights or to the seat and offering resistance to movement of the pedal away from the seat by a user*; and

[(7)] a trapeze bar pivotally mounted between the two left hand *side* uprights, or between the two right hand *side* uprights or between the two upper rails, biased to provide resistance to movement.

2. The exercise apparatus of claim 1, wherein each of the from 2 to 5 springs can be independently connected between the first carriage section and the frame.

3. The exercise apparatus of claim 1, wherein each of the from 2 to 5 springs can be independently connected between the first carriage section and the second carriage section.

4. The exercise apparatus of claim 1, wherein each of the from 2 to 5 springs can be independently connected between the second carriage section and the frame.

[5. The exercise apparatus of claim 1, comprising springs connecting the pedal to the uprights or to the seat and offering resistance to movement of the pedal away from the seat by a user.]

6. The exercise apparatus of claim 1, comprising springs connecting the trapeze bar to the [frame, e.g. to the] uprights or to the *upper* rails, offering resistance to movement of the bar by a user.

7. The exercise apparatus of claim 1, further comprising a foot bar attached between the left hand *side* uprights or the right hand *side* uprights.

[8. The exercise apparatus of claim 1, further comprising a ladder attached to the upper rails.]

[9. The exercise apparatus of claim 8, wherein the upper rails extend between the right hand uprights and the left hand uprights and comprise projections which project to the right of the right hand uprights or to the left of the left hand uprights, the ladder being connected to the projections.]

10. The exercise apparatus of claim [9] *1*, further comprising a flat board, attached to the right hand *side* uprights or to the left hand *side* uprights, substantially perpendicular to the exercise carriage.

11. The exercise apparatus of claim 1, comprising one or more buffers to lessen the impact of the exercise carriage at the limits of its travel on the rails.

12. The exercise apparatus of claim 1, comprising four pulleys, two mounted on each of the left hand side uprights, wherein each pulley can be fastened at any position along the length of its upright.

*13. Exercise apparatus, comprising:*

*a box-like frame defining an exercise area within and around the frame, the frame comprising:*

*two lower rails;*

*two left hand side uprights;*

*two right hand side uprights; and*

*two upper rails mounted between the two pairs of uprights;*

*an exercise carriage, comprising a first carriage section and a second carriage section, mounted on the lower rails, wherein the first carriage section and the second carriage section can be (i) connected together to form a single exercise carriage which can slide forwards and backwards on the rails during exercise against an adjustable resistance, and (ii) disconnected to form two exercise carriages each of which can independently slide forwards and backwards on the rails during exercise against an adjustable resistance;*

*a lock to lock the first carriage section at any position along the rails;*

*a seat mounted between the two left hand side uprights, or between the two right hand side uprights;*

*a resistance-biased foot pedal associated with the seat; and*

*springs connecting the pedal to the uprights or to the seat and offering resistance to movement of the pedal away from the seat by a user,*

*wherein the two left hand side uprights are proximal to the first carriage section, and*

*wherein the two right hand side uprights are proximal to the second carriage section.*

*14. The exercise apparatus of claim 13, wherein the adjustable resistance is provided by springs.*

*15. The exercise apparatus of claim 13, comprising springs removably attachable to the frame, the first carriage section and/or the second carriage section so that:*

*the first carriage section can be connected by one or more springs to the second carriage section; and/or*

*the second carriage section can be connected by one or more springs to the frame.*

*16. The exercise apparatus of claim 13, comprising springs removably attachable to the frame, the first carriage section and/or the second carriage section so that:*

*the first carriage section can be connected by one or more springs to the second carriage section; and/or*

*the first carriage section can be connected by one or more springs to the frame.*

*17. The exercise apparatus of claim 13, comprising from 2 to 5 springs which can each be independently connected between the first carriage section and the frame.*

*18. The exercise apparatus of claim 13, comprising from 2 to 5 springs which can each be independently connected between the first carriage section and the second carriage section.*

*19. The exercise apparatus of claim 13, comprising from 2 to 5 springs which can each be independently connected between the second carriage section and the frame.*

*20. The exercise apparatus of claim 13, comprising a lock to lock the second carriage section at any position along the rails.*

*21. The exercise apparatus of claim 13, comprising:*

*two pulleys attached to the frame;*

*two ropes threaded through the pulleys; and*

*two rope cleats on the first carriage section,*

*wherein the ropes have two ends, one of which is free and one is to attach to one of the rope cleats.*

*22. The exercise apparatus of claim 13, comprising four pulleys, two mounted on each of the left hand side uprights, wherein each pulley can be fastened at any position along the length of its upright.*

*23. The exercise apparatus of claim 13, comprising a trapeze bar pivotally mounted between the two left hand side uprights, or between the two right hand side uprights or between the two upper rails, biased to provide resistance to movement.*

*24. The exercise apparatus of claim 23, comprising springs connecting the trapeze bar to the frame, offering resistance to movement of the bar by a user.*

*25. The exercise apparatus of claim 13, comprising a foot bar attached between the left hand side uprights or the right hand side uprights.*

*26. The exercise apparatus of claim 13, comprising a flat board, attached to the right hand side uprights or to the left hand side uprights, substantially perpendicular to the exercise carriage.*

*27. The exercise apparatus of claim 13, comprising one or more buffers to lessen the impact of the exercise carriage at the limits of its travel on the rails.*

*28. The exercise apparatus of claim 13, wherein the seat is configured to be mounted in a fixed position between the two left hand side uprights or between the two right hand side uprights.*

*29. The exercise apparatus of claim 13, wherein the seat is configured to be mounted at a level that is raised up with respect to the level of the first and second carriage sections.*

*30. Exercise apparatus, comprising:*

*a box-like frame defining an exercise area within and around the frame, the frame comprising:*

*two lower rails;*

*two left hand side uprights;*

*two right hand side uprights; and*

*two upper rails mounted between the two pairs of uprights;*

*an exercise carriage, comprising a first carriage section and a second carriage section, mounted on the lower rails, wherein the first carriage section and the second carriage section can be connected together to form a single exercise carriage which can slide forwards and backwards on the rails during exercise against an adjustable resistance, and disconnected to form two exercise carriages each of which can independently slide forwards and backwards on the rails during exercise against an adjustable resistance;*

*a lock to lock the first carriage section at any position along the rails;*

*a seat mounted between the two left hand side uprights, or between the two right hand side uprights;*

*a resistance-biased foot pedal associated with the seat; and*

*four pulleys, two mounted on each of the left hand side uprights, wherein each pulley can be fastened at any position along the length of its upright,*

*wherein the two left hand side uprights are proximal to the first carriage section, and*

*wherein the two right hand side uprights are proximal to the second carriage section.*

*31. Exercise apparatus, comprising:*

*a box-like frame defining an exercise area within and around the frame, the frame comprising:*

*two lower rails;*

*two left hand side uprights;*

*two right hand side uprights; and*

*two upper rails mounted between the two pairs of uprights;*

*an exercise carriage, comprising a first carriage section and a second carriage section, mounted on the lower rails, wherein the first carriage section and the second carriage section can be connected together to form a single exercise carriage which can slide forwards and backwards on the rails during exercise against an adjustable resistance, and disconnected to form two exercise carriages each of which can independently slide forwards and backwards on the rails during exercise against an adjustable resistance;*

*a lock to lock the first carriage section at any position along the rails;*

*a seat mounted between the two left hand side uprights, or between the two right hand side uprights;*

*a resistance-biased foot pedal associated with the seat; and*

*one or more buffers to lessen the impact of the exercise carriage at the limits of its travel on the rails,*

*wherein the two left hand side uprights are proximal to the first carriage section, and*

*wherein the two right hand side uprights are proximal to the second carriage section.*

* * * * *